United States Patent [19]

Jonke

[11] Patent Number: 5,160,012
[45] Date of Patent: Nov. 3, 1992

[54] CRANE SYSTEM WITH CONTINUAL CONVEYOR SYSTEM FOR MOVING DISCRETE ITEMS OF FREIGHT

[76] Inventor: Hans Jonke, Schlüsselgasse 2/14, 1040 Wien, Austria

[21] Appl. No.: 471,201

[22] Filed: Jan. 29, 1990

[30] Foreign Application Priority Data

Feb. 2, 1989 [AT] Austria ................................. 213/89

[51] Int. Cl.$^5$ ..................... B65E 37/00; B65E 47/46
[52] U.S. Cl. .................................. 198/369; 198/611; 414/139.4; 414/140.8
[58] Field of Search .................. 414/137–139, 414/141, 139.4, 139.9, 140.2, 140.3, 140.5, 140.8, 141.7, 142.8, 143.1, 141.8; 198/358, 360, 365, 370, 851

[56] References Cited

U.S. PATENT DOCUMENTS

| | | | |
|---|---|---|---|
| 3,589,499 | 6/1971 | Cristy | 198/103 |
| 4,591,310 | 5/1986 | Toaspern et al. | 414/786 |
| 4,830,172 | 5/1989 | Hilton et al. | 198/392 |
| 4,897,012 | 1/1990 | Brewer | 414/137.4 |

FOREIGN PATENT DOCUMENTS

| | | |
|---|---|---|
| 1290875 | 3/1969 | Fed. Rep. of Germany . |
| 2447600 | 4/1976 | Fed. Rep. of Germany . |
| 2456260 | 4/1976 | Fed. Rep. of Germany . |
| 2825553 | 12/1979 | Fed. Rep. of Germany . |
| 2932113 | 2/1981 | Fed. Rep. of Germany . |
| 3029863 | 3/1982 | Fed. Rep. of Germany . |
| 151194 | 8/1985 | Japan ................ 414/141.7 |
| 714071 | 8/1954 | United Kingdom ........ 414/141.7 |

Primary Examiner—Sherman Basinger
Attorney, Agent, or Firm—Beveridge, DeGrandi & Weilacher

[57] ABSTRACT

One or a plurality of circular conveyors are arranged at the transition points between vertical and horizontal conveyor sections in a continually operating conveyor system for moving items of freight, in particular sacks, cases, bundles, or the like. The truncated conical surface of a circular conveyor that carries the items of freight subtends an angle of other than 90° with the axis of rotation of the vertical conveyor and is in constant movement independent of the direction of rotation or the orientation of the vertical conveyor. The safe, non-damaging transfer of the items of freight between the vertical and the horizontal conveyor sections is ensured by the position of the inner edge of the surface at the level of the transition point (guide wheels) of the supporting platforms of the vertical conveyor.

40 Claims, 2 Drawing Sheets

CRANE SYSTEM WITH CONTINUAL CONVEYOR SYSTEM FOR MOVING DISCRETE ITEMS OF FREIGHT

BACKGROUND OF THE INVENTION

The present invention relates to a crane system that incorporates a continual conveyor system for moving discrete items of freight, in particular sacks, crates, bundles, or the like, comprising at least one vertical conveyor section adjoining other conveyor sections that have horizontal or close to horizontal conveyor lines, said at least one vertical conveyor section being rotatable about a vertical axis in a traversing housing, there being a horizontally arranged circular conveyor at least at one end of the vertical conveyor.

Known mobile ship unloading systems, such as are described, for example, in DE-OS 29 32 113 or in DE-OS 30 29 863, incorporate vertical conveyors that are suspended from the crane, and incorporate an L-shaped pick-up arm for bulk material. The vertical conveyor is configured as a grater or bucket belt and moves the bulk material from the pick-up in the ship to a circular conveyor that is incorporated ahead of the conveyor belt of the boom. This transfer of the bulk material in the upper area of the vertical conveyor is effected by dropping it into a conveyor chute and then onto the circular conveyor. From there, when the bulk material is removed, as is made clear in DE-AS 24 56 260, by rotating carrier shovels that feed the bulk material to a base opening in the stationary trough of the circular conveyor.

A similar distribution system of bulk material is known from DE-OS 24 47 600, wherein a traversable vertical conveyor discharges the bulk material via an inclined trough to a rotating circular conveyor. The removal of the bulk material from the circular conveyor onto a conveyor belt is, in this case, effected by means of a clearing wheel, the clearing arms of which fit into the trough of the circular conveyor.

All of the systems described heretofore are suitable only for conveying bulk materials along the unloading direction, with bulk materials being dropped from the vertical conveyors and then moved further on by means of troughs or chutes. Were these systems used to move discrete items of freight, such as sacks or cases, this would cause very severe damage during the transfer from the vertical conveyor to the circular conveyor because of the drop into the chutes. In addition, it is impossible to reverse the direction of movement so as to load a ship using such systems, since all of the system operate only as unloading systems.

DE-AS 12 74 505 proposes that for purposes of loading individual items of freight, the freight be moved to the vertical conveyor at equal time intervals by means of timed or pulse-type belts. However, the system described therein permits only the loading of ships and does not permit the loading station to be traversed within the ship.

SUMMARY OF THE INVENTION

It is desired to overcome all of these disadvantages and difficulties and to create a system in which movement of discrete items of freight that is not injurious to the freight itself since any fall-down is avoided is possible at a continual and high throughput in both directions, and in which brief differences in the delivery frequencies are balanced out.

In addition, it is intended that the feed/removal of the items of freight can be effected in any direction, to which end rotation or orientation of the vertical conveyor section with its pick-up arm about its conveying direction is necessary. Furthermore, the present invention provides solutions that are simpler in the sense of economy than those that use spiral conveyor systems for moving material vertically.

Accordingly, the present invention features a circular conveyor with a surface to support the items of freight, said support surface being of a truncated conical configuration and subtending an angle other than 90° with the axis of rotation of the vertical conveyor, said circular conveyor being adapted to run continually and independently of a direction of movement or orientation of the vertical conveyor, the inner edge of said support surface that is closest to the end of the vertical conveyor being arranged at the level of the transition point of platforms of said vertical conveyor that carries the items of freight.

It is preferred that a plurality, in particular in each instance two, horizontally arranged turntables or circular conveyors be arranged at the upper and/or lower ends of the vertical conveyor, with the inner edges of the truncated conical surface of both conveyors arranged proximate to the level of the end of the vertical conveyor. Guide rails for the items of freight are provided adjacent to the lowermost edge of each truncated conical surface of the circular conveyors.

These guide rails also configured as truncated cones and are essentially arranged so as to stand perpendicular to the surfaces of the circular conveyor, the guide rail of the circular conveyor being rotatable relative to the surface of the circular conveyor and having closeable openings at one or a plurality of points. It is expedient that the guide rails consist of rollers, belts, slipways, or the like, which can also be driven.

The attachment of two circular conveyors at the upper end of the vertical conveyor is considered to be particularly advantageous so as to provide for a change-over in direction of the movement of the items of freight in both directions. Two switching conveyors serve to change the direction in which the items of freight are moved from, for example, a ship loading to a ship unloading mode.

In addition, changing the speed of rotation of the turntable makes it possible to incorporate a buffer effect in order to eliminate any brief backup of items freight without having to slow down or stop the conveyor belt that is moving these items of freight. This also ensures particular economical operation.

BRIEF DESCRIPTION OF THE PREFERRED EMBODIMENT

The present invention will be described in greater detail below with reference to the drawings appended hereto, wherein.

DETAILED DESCRIPTION OF THE PREFERRED EMBODIMENT

Figure 1:
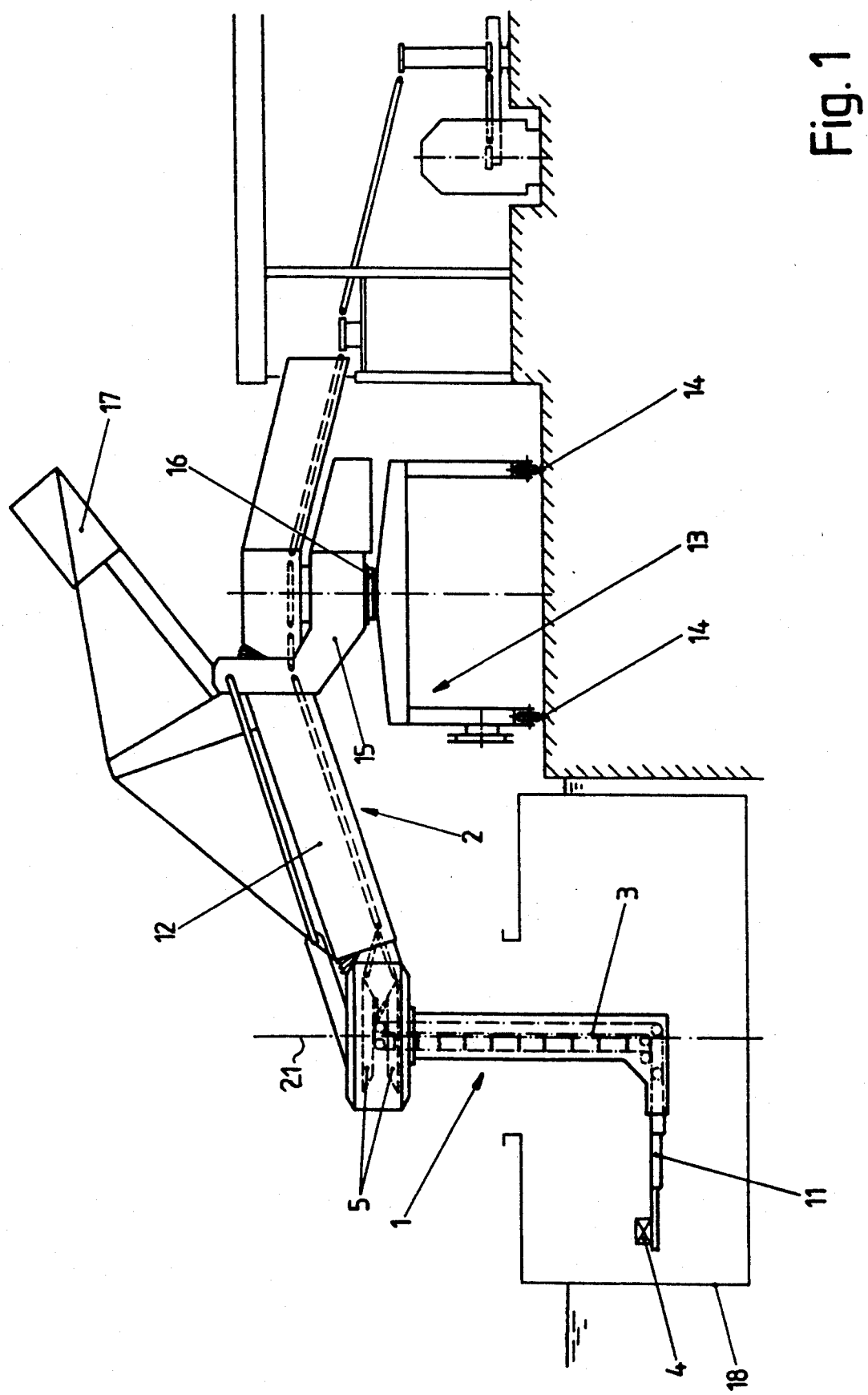
FIG. 1 shows a side view of a system configured as a ship unloading crane.

The present invention is illustrated using the example of a mobile boom-type crane used for loading and unloading ships. A supporting structure 13 that is configured as a gantry can be moved along the edge of the quay on rails 14. A C-shaped tower 15 that can pivot on a bearing 16 is installed on the gantry; a crane boom 12 and a counterweight 17 are hinged onto this C-shaped tower. At its front end, the crane boom 12 supports a housing 30 which supports vertical conveyor 3.

The vertical conveyor 3 operates in the manner of an endless conveyor-Type elevator with platforms 23; in the end positions these pass around guide wheels 22 and thus permit the continual movement of the items of freight 4 along the vertical conveyor section 1. This manner of conveying items of freight is known per se and for this reason is not described in greater detail herein. A pick-up arm 11 that projects as an L-shape from the vertical conveyor 3 serves to move the items of freight 4 into the vertical conveyor 3; this arm 11 can be traversed about the vertical axis of rotation 21 with the vertical conveyor and, in order to increase accessibility within the hold of the ship, can also be inclined or else arranged so as to pivot about a horizontal axis, with the conveyor section consisting of a telescoping conveyor belt.

Figure 2:
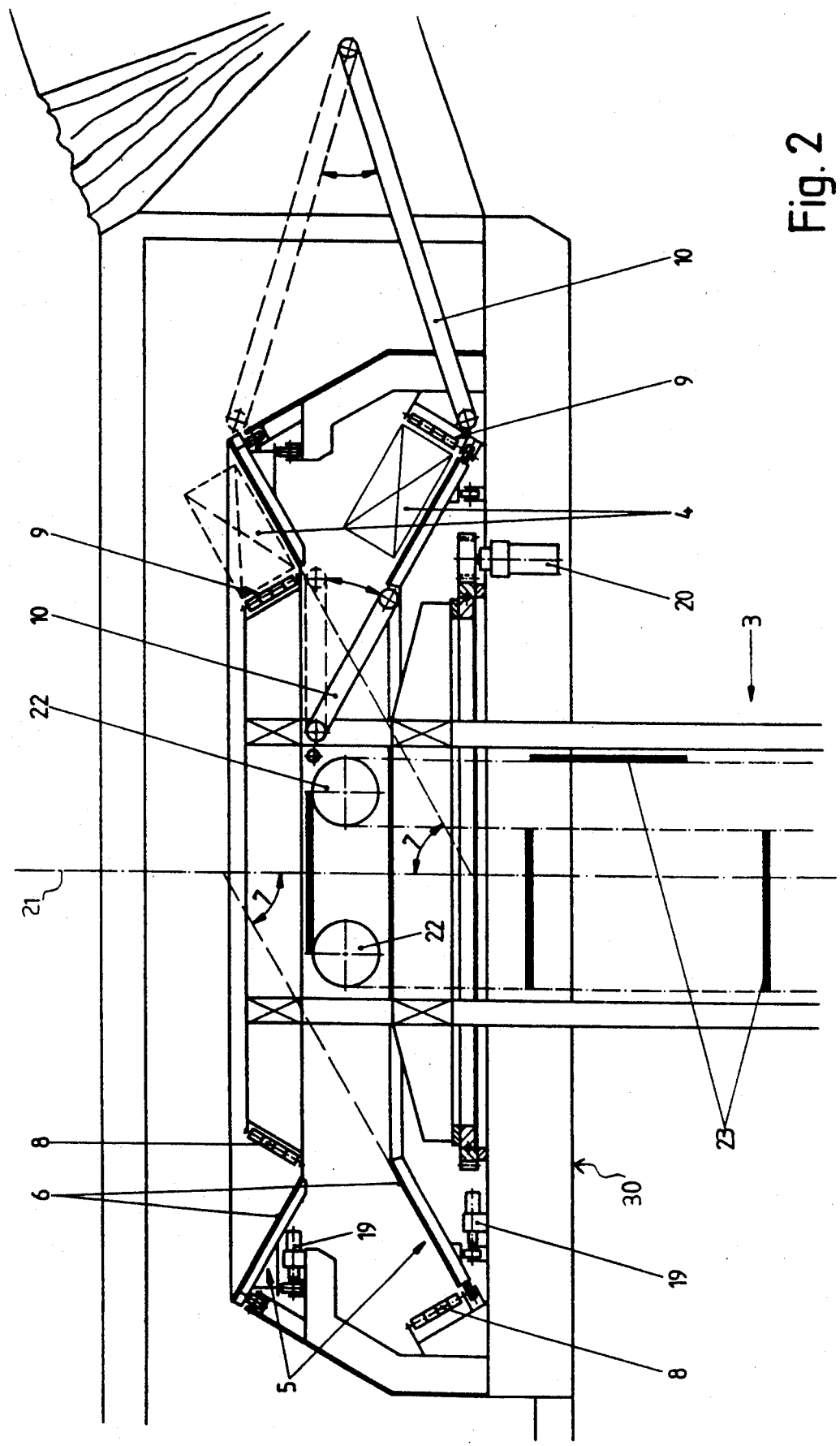
FIG. 2 shows the area of the transition point from the vertical conveyor to the circular conveyor at larger scale.

Two circular conveyors 5 are arranged at the upper end of the vertical conveyor 3 in order to pass on the item of freight, the upper of the two circular conveyors then coming into action if the ship 18 is to be loaded. To this end, the two switching conveyors 10 are moved into the upper position as indicated by the broken lines (FIG. 2). Now the item of freight coming from the belt of the crane boom 12 can be moved onto the surface 6 of the upper circular conveyor 5, the inner end of which is arranged at the level of the guide wheels 22 and because of the inclined plane (angle 7) of the truncated conical circular conveyor, the freight slips downward until it comes to rest against the guide rail 8.

The guide rail 8 is similarly configured as a truncated cone and has on its periphery one or a plurality of closeable openings 9. In order that the openings 9 can now be set opposite the switching conveyor 10 and the adjoining horizontal conveyor sections when the vertical conveyor 3 is traversed, both the guide rails 8 and the surfaces 6 of the circular conveyor 5 are arranged so as to be able to traverse. Now, the item of freight 4 is slid onto the vertical conveyor 3 from the switching conveyor 10 or from short horizontal conveyor belt arranged beneath these (not shown) in time with the descending platforms 23 of the vertical conveyor 3, whereupon they are moved downward on the vertical conveyor section 1.

The traverse drives 19 for the circular conveyor 5 and the traversing drive 20 for the vertical conveyor permit full rotation (360°) independently of each other.

In order to provide for movement in the opposite direction (when unloading the ship), the two switching conveyors 10 are reset.

The present invention is not confined to the embodiment of a level-luffing crane that is shown configured especially as a ship unloading crane and shown in the drawings appended hereto. Thus, for the conveyor system according to the present invention any supporting structure for the crane is possible such as can be used in seaports, inland ports, or any other trans-shipment facility (e.g., at railroad stations).

The embodiments of the invention in which an exclusive property or privilege is claimed are defined as follows:

1. A crane system for transporting discrete items of freight, which is adaptable for movement of freight in either an unloading or a loading direction, comprising:
    a supporting crane structure;
    a continual conveyor system supported by said crane structure, said continual conveyor system comprising,
    a vertical conveyor which includes load carrying platforms and an upper and a lower end, said vertical conveyor being rotatably supported about a vertical axis by a traversing housing of said supporting crane structure,
    means for rotating said vertical conveyor about the vertical axis,
    a second conveyor having a first end and a second end with the first end of said second conveyor positioned adjacent said vertical conveyor such that the discrete items of freight being transported by said continual conveyor system traverse between a load carrying platform at the upper end of said vertical conveyor and the first end of said second conveyor,
    a first circular conveyor surrounding said vertical conveyor, said first circular conveyor including an inclined, truncated conical freight support surface which subtends an angle other than 90° with respect to the axis of rotation of the vertical conveyor, said truncated conical support surface including an inner and outer edge,
    means for rotating said first circular conveyor about the vertical axis,
    a second circular conveyor positioned above said first circular conveyor, said second conveyor including an inclined, truncated conical freight support surface with an inner and an outer edge,
    means for rotating said second circular conveyor about the vertical axis,
    said second conveyor including switching means for switching the second end of said second conveyor from a first position wherein the second end of said second conveyor is adjacent the inner edge of the support surface of said first circular conveyor for freight transport therebetween to a second position wherein the second end of said second conveyor is adjacent the inner edge of the support surface of said second circular conveyor for freight transport therebetween, and said circular conveyors being dimensioned and arranged for rotating independently of a direction of movement or orientation of the vertical conveyor.

2. A crane system as recited in claim 1, wherein said supporting crane structure includes a boom with said housing provided at one end of said boom, and said housing rotatably supporting the upper end of said vertical conveyor such that said vertical conveyor is adapted to rotate about a central axis of said vertical conveyor.

3. A crane system as recited in claim 2, wherein said means for rotating said vertical conveyor includes a driver supported by said housing and in engagement with the upper end of said vertical conveyor for rotating said vertical conveyor.

4. A crane system as recited in claim 2, wherein said first circular conveyor is rotatably supported by said housing such that said first circular conveyor is adapted to rotate independent of said vertical conveyor.

5. A crane system as recited in claim 1, further comprising a guide rail positioned between the inner edge of the freight support surface of said second circular conveyor and the second end of said second conveyor.

6. A crane system as recited in claim 5, wherein said guide rail is circular and includes an opening through which freight is adapted to pass in travelling between said second conveyor and said second circular conveyor.

7. A crane system as recited in claim 6, wherein said guide rail is positioned so as to extend perpendicularly with respect to the freight support surface of said second circular conveyor.

8. A crane system as recited in claim 1, wherein said switchable second conveyor is horizontal when in said second position and sloping downwardly in an inner to outer direction when is said first position.

9. A crane system as recited in claim 1, further comprising a circular guide rail positioned adjacent the outer edge of said first circular conveyor and extending transverse to the freight support surface of said first circular conveyor, and said circular guide rail having an opening through which freight is adapted to pass.

10. A crane system as recited in claim 1, wherein the inner edge of the freight support surface of said second circular conveyor is lower than the outer edge.

11. A crane system as recited in claim 1, wherein the outer edge of the freight support surface of said first circular conveyor is lower than the inner edge.

12. A crane system for transporting discrete items of freight, comprising:
    a supporting crane structure;
    continual conveyor means supported by said crane structure, said continual conveyor means comprising,
    a first conveyor extending in a vertical direction and having load carrying platforms and an upper and a lower end;
    a second conveyor having a first end and a second end with the first end of said second conveyor positioned adjacent said first conveyor such that the discrete items of freight being transported by said continual conveyor means traverse between a load carrying platform at the upper end of said first conveyor and the first end of said second conveyor,
    a first circular conveyor surrounding the upper end of said first vertically extending conveyor, said first circular conveyor including an inclined, truncated conical freight support surface with an inner and an outer edge,
    a second circular conveyor positioned above said first circular conveyor, said second circular conveyor including an inclined, truncated conical freight support surface with an inner and an outer edge, and
    said second conveyor being a switching conveyor with the second end of said second conveyor being switchable from a first position wherein the second end of said second conveyor is adjacent the inner edge of the support surface of said first circular conveyor for freight transport therebetween to a second position wherein the second end of said second conveyor is adjacent the inner edge of the support surface of said second circular conveyor for freight transport therebetween.

13. A crane system as recited in claim 12, wherein the inner edge of the support surface of said first circular conveyor is higher than the outer edge of the support surface of said first circular conveyor, and the inner edge of the support surface of said second circular conveyor is lower than the outer edge of the support surface of said second circular conveyor.

14. A crane system as recited in claim 13, wherein said switchable second conveyor is horizontal when in said second position and sloping downwardly in an inner to outer direction when is said first position.

15. A crane system as recited in claim 14, wherein the first end of said switchable second conveyor is pivotably fixed in height and the second end of said switchable second conveyor pivots about the first end of said second conveyor.

16. A crane system as recited in claim 12, wherein said switchable second conveyor is horizontal when in said second position and sloping downwardly in an inner to outer direction when is said first position.

17. A crane system as recited in claim 12, further comprising a first circular guide surrounding the inner edge of said second circular conveyor and a second circular guide surrounding the outer edge of said first circular conveyor.

18. A crane system as recited in claim 17, wherein said first and second circular guides are each configured as a truncated cone extending essentially perpendicular to the respective freight support surface of said first and second circular conveyor.

19. A crane system as recited in claim 18, wherein said circular guides each include an opening through which freight is adapted to pass.

20. A crane system as recited in claim 12, wherein said supporting crane structure includes a boom with a housing formed at one end, and said housing rotatably supporting said first conveyor such that said first conveyor is adapted to rotate about a central axis of said vertically extending first conveyor.

21. A crane system as recited in claim 20, wherein said first and second circular conveyors are rotatably supported by said housing and said first and second circular conveyors being adapted for rotation independent of said first vertically extending conveyor and independently with respect to one another.

22. A crane system as recited in claim 20, wherein said supporting crane structure includes a gantry crane and said boom is supported by a C-shaped tower pivotably supported by said gantry crane.

23. A crane system as recited in claim 12, further comprising a third conveyor having a first and second end, said third conveyor being a switching conveyor with the first end of said third conveyor adapted to move from a first position wherein the first end of said third conveyor is adjacent to the outer edge of said second circular conveyor for freight transport therebetween to a second position wherein the first end of said third conveyor is adjacent the outer edge of said first circular conveyor for freight transport therebetween.

24. A crane system as recited in claim 23, wherein the second end of said third conveyor is fixed at a level between the outer edges of said first and second circular conveyors and forms a pivot location about which the first end of said switchable third conveyor pivots.

25. A crane system as recited in claim 12, further comprising a pick-up arm extending transversely away from the lower end of said first conveyor.

26. A crane system as recited in claim 25, wherein said pick-up arm includes a telescoping conveyor.

27. A crane system as recited in claim 1, further comprising a third conveyor having a first and second end with said first end being adjacent the outer edge of said first circular conveyor for traversing freight therebetween.

28. A crane system as recited in claim 1, wherein the inner edge of the support surface of said first circular conveyor is higher than the outer edge of the support surface of said first circular conveyor, and the inner edge of the support surface of said second circular conveyor is lower than the outer edge of the support surface of said second circular conveyor.

29. A crane system as recited in claim 28, wherein said switchable second conveyor is horizontal when in said second position and sloping downwardly in an inner to outer direction when is said first position.

30. A crane system as recited in claim 29, wherein the first end of said switchable second conveyor is pivotably fixed in height and the second end of said switchable second conveyor pivots about the first end of said second conveyor.

31. A crane system as recited in claim 1, further comprising a first circular guide surrounding the inner edge of said second circular conveyor and a second circular guide surrounding the outer edge of said first circular conveyor.

32. A crane system as recited in claim 31, wherein said first and second circular guides are each configured as a truncated cone extending essentially perpendicular to the respective freight support of said first and second circular conveyors.

33. A crane system as recited in claim 32, wherein said circular guides each include an opening through which freight is adapted to pass.

34. A crane system as recited in claim 1, wherein said first and second circular conveyors are rotatably supported by said housing and adapted for rotation independent of said first vertically extending conveyor and independently with respect to one another.

35. A crane system as recited in claim 1, wherein said supporting crane structure includes a gantry crane and said support structure includes a boom which is supported by a C-shaped tower pivotably supported by said gantry crane.

36. A crane system as recited in claim 1, further comprising a third conveyor having a first and second end, said third conveyor being a switching conveyor with the first end of said third conveyor adapted to move from a first position wherein the first end of said third conveyor is adjacent to the outer edge of said second circular conveyor for freight transport therebetween to a second position wherein the first end of said third conveyor is adjacent the outer edge of said first circular conveyor for freight transport therebetween.

37. A crane system as recited in claim 36, wherein the second end of said third conveyor is fixed at a level between the outer edges of said first and second circular conveyors and forms a pivot location about which the first end of said switchable third conveyor pivots.

38. A crane system as recited in claim 37 further comprising additional conveyors extending away from the second end of said third conveyor.

39. A crane system as recited in claim 1, further comprising a pick-up arm extending transversely away from the lower end of said vertical conveyor.

40. A crane system as recited in claim 39, wherein said pick-up arm includes a telescoping conveyor section.

* * * * *